(12) United States Patent  
Lockhart et al.

(10) Patent No.: US 10,717,558 B2  
(45) Date of Patent: Jul. 21, 2020

(54) MACHINE AND PROCESS FOR PACKAGING UNIQUE ITEMS

(71) Applicant: Morrisette Paper Company, Inc., Browns Summit, NC (US)

(72) Inventors: Anthony Lockhart, Hudson, NC (US); Don Carlton, Lenoir, NC (US)

(73) Assignee: Morrisette Paper Company, Inc., Browns Summit, NC (US)

( * ) Notice: Subject to any disclaimer, the term of this patent is extended or adjusted under 35 U.S.C. 154(b) by 589 days.

(21) Appl. No.: 15/294,831

(22) Filed: Oct. 17, 2016

(65) Prior Publication Data  
US 2018/0105306 A1 Apr. 19, 2018

(51) Int. Cl.  
*B65B 57/12* (2006.01)  
*B65B 5/02* (2006.01)  
*B65B 53/02* (2006.01)  
*B65B 41/12* (2006.01)  
*B65B 51/10* (2006.01)  
(Continued)

(52) U.S. Cl.  
CPC .............. *B65B 57/12* (2013.01); *B65B 5/022* (2013.01); *B65B 11/48* (2013.01); *B65B 53/02* (2013.01); *B65B 41/12* (2013.01); *B65B 51/10* (2013.01); *B65B 61/06* (2013.01); *B65B 2210/04* (2013.01)

(58) Field of Classification Search  
CPC ......... B65B 11/48; B65B 57/10; B65B 57/12; B65B 5/022; B65B 2210/02; B65B 2210/04; B65B 61/06; B65B 41/12; B65B 51/10; B65B 9/073; B65B 57/02; B65B 59/001; B65B 59/02; B29C 65/7433; B29C 65/18; B29C 65/22; B29C 65/223; B29C 65/745; B29C 65/74; B29C 65/7451; B65H 23/06; B31B 50/64; B31B 50/642; B31B 50/645; B31B 70/14; B31B 70/006; B31B 70/64; B31B 2150/0012; B31B 2150/003; B31B 2150/10; B31B 2155/003  
USPC ...... 493/22, 8, 186, 189, 193, 195, 200, 235  
See application file for complete search history.

(56) References Cited

U.S. PATENT DOCUMENTS

1,489,874 A * 4/1924 Wheildon ............... B65B 25/24  
242/422.5  
1,605,650 A * 11/1926 Derry ..................... B65B 25/24  
242/421.2  
(Continued)

*Primary Examiner* — Robert F Long  
*Assistant Examiner* — Eduardo R Ferrero  
(74) *Attorney, Agent, or Firm* — Womble Bond Dickinson (US) LLP (57) ABSTRACT

A method of packaging a series of differently shaped objects. The method includes receiving a first object to be packaged and identifying a first length of a stock packaging material suitable for enclosing the first object. The method continues by creating, with a bag making machine, a first bag from the stock packaging material having approximately the first length, which leads to substantially enclosing the first object in the first bag. Then the method continues by receiving a second object to be packaged, the second object having a shape or size different from the first object. A second length of the stock packaging material suitable for enclosing the second object is identified. The method continues by creating, with the bag making machine, a second bag from the stock packaging material having approximately the second length, followed by substantially enclosing the second object in the second bag.

2 Claims, 8 Drawing Sheets

(51) Int. Cl.
*B65B 61/06* (2006.01)
*B65B 11/48* (2006.01)

(56) References Cited

U.S. PATENT DOCUMENTS

| | | | | |
|---|---|---|---|---|
| 2,257,433 A * | 9/1941 | Stokes | ................... | B65B 9/213 131/68 |
| 2,265,253 A * | 12/1941 | Smith | ................... | B65B 61/06 493/194 |
| 2,285,939 A * | 6/1942 | Neumair | ................ | B65B 41/16 242/421.3 |
| 2,679,280 A | 5/1954 | Marsh | | |
| 2,705,443 A * | 4/1955 | Colby | ................... | B26D 1/04 493/202 |
| 2,726,706 A * | 12/1955 | Hakomaki | ......... | B29C 65/7433 156/251 |
| 2,749,020 A * | 6/1956 | Baxter | ................... | B29C 65/02 156/499 |
| 2,775,082 A * | 12/1956 | Vogt | ......................... | B65B 7/02 53/469 |
| 2,803,100 A * | 8/1957 | Aalseth | ................... | B29C 65/18 53/371.4 |
| 2,824,685 A * | 2/1958 | Patton | ................... | B65D 27/10 229/69 |
| 2,880,925 A * | 4/1959 | Klasing | ............... | B29C 65/7412 383/106 |
| 2,882,956 A * | 4/1959 | Weist | ...................... | B29C 65/02 156/351 |
| 2,961,031 A * | 11/1960 | Fener | ...................... | B29C 65/38 156/515 |
| 2,963,236 A * | 12/1960 | Grosser | ................... | B65B 41/12 242/421.2 |
| 3,234,072 A * | 2/1966 | Dreeben | ............. | B29C 65/7453 156/498 |
| 3,239,993 A | 3/1966 | Cherrin | | |
| 3,321,888 A | 5/1967 | Kirkhof et al. | | |
| 3,394,798 A * | 7/1968 | Sako | ........................ | B65B 61/06 206/526 |
| 3,527,633 A * | 9/1970 | Bertoglio | ................ | B29C 65/18 156/353 |
| 3,533,331 A * | 10/1970 | Kugler | ................... | B31B 70/00 493/194 |
| 3,551,260 A * | 12/1970 | Catherwood | ........... | B29C 65/18 156/583.5 |
| 3,640,790 A * | 2/1972 | Rowley | ................ | B29C 65/743 156/251 |
| 3,753,829 A | 8/1973 | Freeman | | |
| 3,763,620 A * | 10/1973 | Giraudi | ................ | B65B 31/024 53/417 |
| 3,930,041 A * | 12/1975 | Komatsu | ................ | B65B 51/10 156/309.6 |
| 4,065,344 A | 12/1977 | Weist | | |
| 4,104,108 A | 8/1978 | Kishida et al. | | |
| 4,156,382 A | 5/1979 | Baker | | |
| 4,240,336 A | 12/1980 | Grevich et al. | | |
| 4,288,968 A * | 9/1981 | Seko | ........................ | B29C 65/18 156/583.1 |
| 4,454,704 A * | 6/1984 | Ullman | ................... | B29C 65/18 156/359 |
| 4,490,963 A * | 1/1985 | Knudsen | ................ | B65B 9/045 53/131.5 |
| 4,518,378 A | 5/1985 | Schulze et al. | | |
| 4,543,766 A * | 10/1985 | Boshinski | ............... | B65B 11/54 177/165 |
| 4,838,977 A * | 6/1989 | Ebmeyer | ................ | B31B 70/00 156/252 |
| 4,931,033 A * | 6/1990 | Leeds | ..................... | B31B 70/00 383/10 |
| 4,995,860 A * | 2/1991 | Wilfong, Jr. | ......... | B65D 33/001 206/554 |
| 5,041,070 A * | 8/1991 | Blaser | ..................... | B26D 5/005 226/27 |
| 5,161,350 A * | 11/1992 | Nakamura | ............... | B65B 9/067 53/133.4 |
| 5,209,573 A * | 5/1993 | Freeman | ................ | B65D 31/04 383/108 |
| 5,226,858 A * | 7/1993 | Snowdon | ................... | B26F 1/44 206/554 |
| 5,282,778 A * | 2/1994 | Achelpohl | ............ | B29C 65/745 493/1 |
| 5,358,592 A * | 10/1994 | Fukuyama | .......... | B29C 66/8744 156/361 |
| 5,421,803 A * | 6/1995 | Kemanjian | .......... | B65D 33/001 493/198 |
| 6,186,933 B1 * | 2/2001 | DeMatteis | ............ | B29C 65/004 493/193 |
| 6,932,751 B1 * | 8/2005 | Ward | ...................... | B29C 66/841 493/187 |
| 6,996,948 B2 * | 2/2006 | Koke | ...................... | B65B 25/065 53/459 |
| 7,000,369 B1 | 2/2006 | Paviot | | |
| 7,785,177 B2 * | 8/2010 | Plewa | ................. | A22C 11/0245 452/30 |
| 2004/0040262 A1 * | 3/2004 | Palumbo | ................ | B65B 43/465 53/459 |
| 2004/0082454 A1 * | 4/2004 | White | ................... | B65B 43/123 493/189 |
| 2005/0229547 A1 * | 10/2005 | Koke | ...................... | B65B 25/065 53/468 |
| 2005/0274262 A1 * | 12/2005 | Recchia, Jr. | ............ | B29C 65/18 99/353 |
| 2008/0041023 A1 * | 2/2008 | Tsuruta | ................... | B29C 65/18 53/548 |
| 2013/0180210 A1 * | 7/2013 | Hammad | ............... | B65B 31/024 53/405 |
| 2013/0204419 A1 * | 8/2013 | Pettersson | ............... | G06F 17/50 700/97 |
| 2014/0311100 A1 * | 10/2014 | Tilley | ..................... | B29C 65/18 53/479 |
| 2015/0033679 A1 * | 2/2015 | Takahashi | ............... | B65B 41/16 53/556 |
| 2015/0059290 A1 * | 3/2015 | Ewert | ..................... | B65B 59/02 53/432 |
| 2015/0321781 A1 * | 11/2015 | Kristensen | ............... | B65B 57/02 53/451 |

* cited by examiner

MACHINE AND PROCESS FOR PACKAGING UNIQUE ITEMS

FIELD OF DISCLOSURE

The present disclosure relates to machines for creating bags from a stock material. The present disclosure also relates to processes involving packaging uniquely sized and shaped items within bags.

BACKGROUND

Packaging plays a key role in protecting merchandise during transportation, storage and installation. Processes and machines for creating packages, as well as processes and machines for applying the packages to the products, are becoming increasingly automated. Packing of small products produced at high volume often is accomplished using an automated packing process. The small size of these products, the high volume output of thousands of packaged products a day, and the substantial uniformity of these products' shapes, allow for relatively low cost automation of the packaging process.

Packaging of larger, more unique or dissimilar shaped products, typically requires more manual steps. A prime example of a lower volume manual packaging process is currently used in the furniture industry. Packaging is important to the furniture industry to avoid pulls, tears, or rips in the fabric or leather upholstery of a new item. Packaging similarly can help avoid dings or scratches in wood or other surfaces during shipping and delivery.

Figure 1:
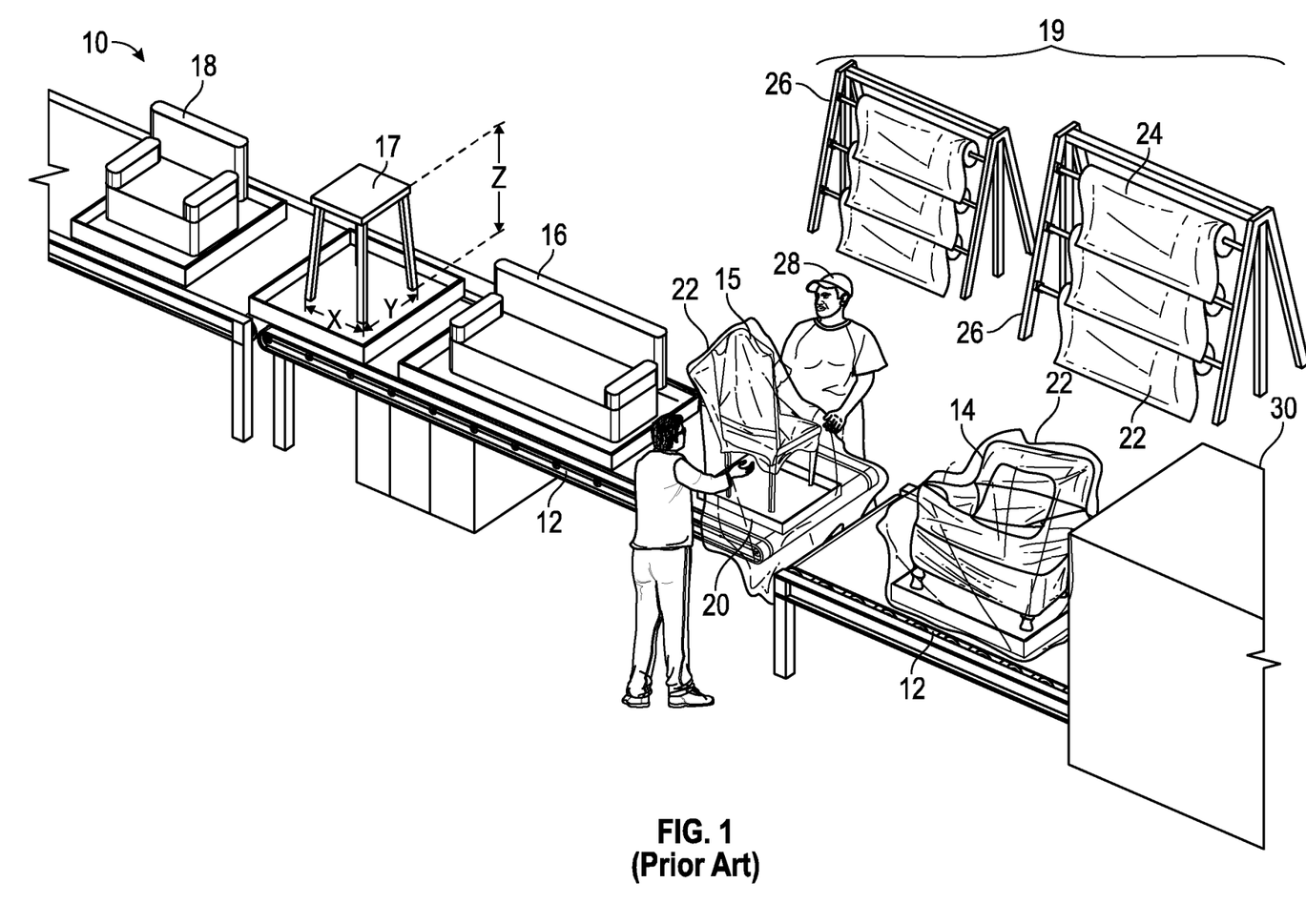
FIG. 1 is a schematic of a process of packaging furniture according to a conventional method.
Figure 2:
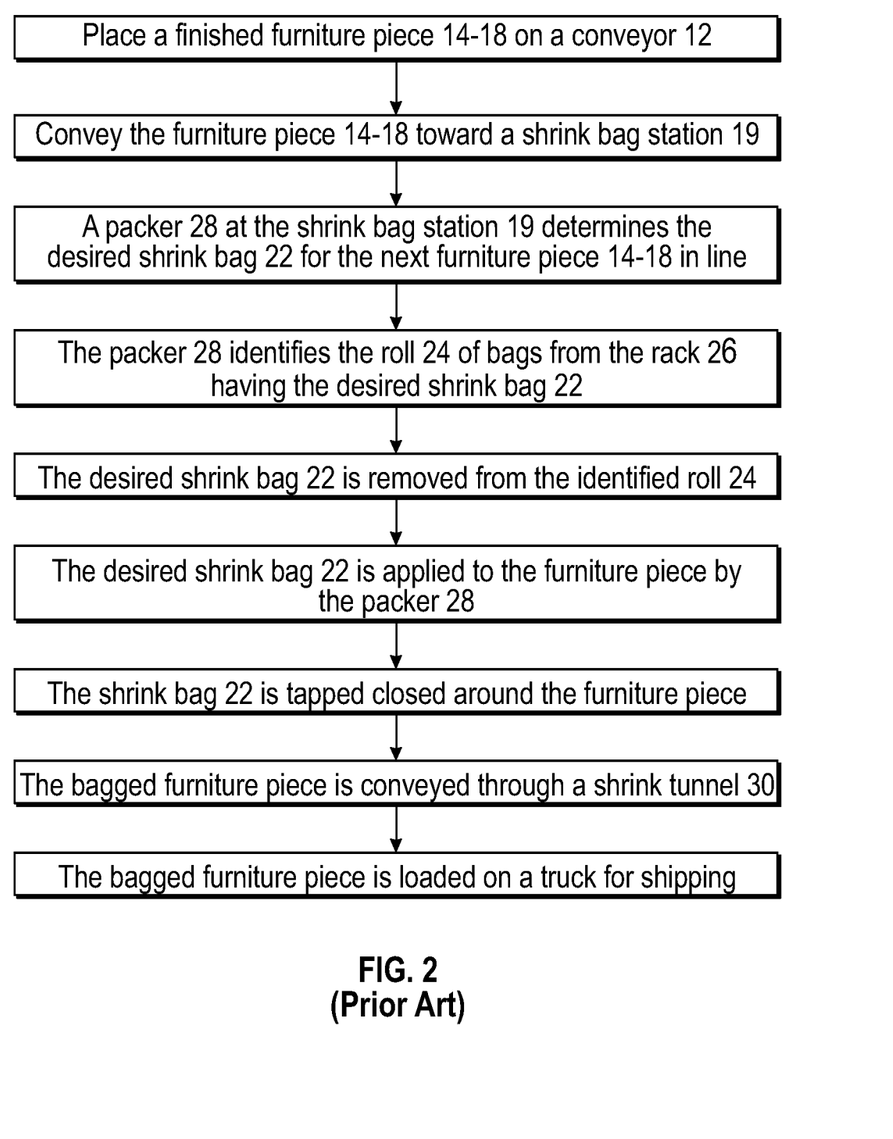
FIG. 2 is a flow chart for a process of packaging furniture according to a conventional method.

FIG. 1 shows a schematic of a furniture packaging line 10. FIG. 2 is a flow chart summarizing a representative packaging process. The packaging line 10 typically includes a series of conveyors 12 receiving finished furniture pieces 14-18 and conveying them along the packaging line to a shrink bag station 19. Unlike, a uniform process, furniture pieces 14-18 are relatively custom made and often manufactured after an order is received. Thus furniture pieces 14-18 are added to the packaging line 10 when completed. As shown in FIG. 1, the result is a series of successive furniture pieces 14-18 that vary significantly in size and shape. FIG. 1 shows a packaged upholstered chair 14, a dining chair 15, a sofa 16, an unpackaged stool 17 and a loveseat 18. Each furniture piece has a furniture length X generally parallel with the conveyor 12, a furniture width Y and a furniture height Z.

Along the packaging line 10 various packaging materials, such as cardboard trays 20, corner protectors, foam bags, etc. may be added to the furniture pieces 14-18 depending upon the construction and/or shape of each piece. To provide a final enclosure for each furniture piece 14-18, and any of the optional packaging materials that may have been added, the furniture piece 14-18 is inserted into a shrink bag 22 at the shrink bag station 19. Presently, shrink bags 22 are provided on continuous rolls 24, with perforations between each bag. Rolls 24 of shrink bags 22 are also arranged on one or more racks 26 allowing for access to several rolls, for example six distinct rolls. Each distinct roll 24 may have shrink bags 22 of different combinations of bag length and circumference. In a typical example, four bag lengths, each provided in two different circumferences, for a total of eight rolls is used. The shrink bags 22 coming off the roll 24 are substantially flat with a sealed end and an open end. In the flat configuration, the distance between the sealed end and the open end would be the bag length L (see FIG. 4). The side edges of the shrink bags 22 may or may not include gussets (i.e. additional folds of material) that allow the shrink bag 22 to have a larger internal volume. The circumference, is therefore equal to twice the width of the shrink bag 22 in the flat configuration plus any additional width provided by the gussets.

A packer 28, is tasked with identifying the next furniture piece (a recliner 15 as illustrated) coming down the packaging line 10, selecting a shrink bag 22 from an appropriate roll 24 that is sufficiently large to enclose that piece, and tearing the selected bag from its respective roll along the perforations. After the furniture piece 15 is slid into the selected shrink bag 22, the open end of the shrink bag is gathered and taped closed. The furniture piece 15 then travels through a shrink tunnel 30 where heat is applied, causing the shrink bag 22 to constrict. When the furniture piece 14-18 exits the shrink tunnel 30, the furniture piece is ready for loading into a truck for delivery to the warehouse, retailer or customer.

SUMMARY

Embodiments of the present disclosure provide methods of packaging a series of differently shaped objects, such as furniture. An exemplary method comprises receiving a first object to be packaged, identifying a first length of a stock packaging material suitable for enclosing the first object, and creating, with a bag making machine, a first bag from the stock packaging material having approximately the first length. The packaging method further comprises substantially enclosing the first object in the first bag. The method then includes receiving a second object to be packaged, the second object having a shape or size different from the first object, identifying a second length of the stock packaging material suitable for enclosing the second object, and creating, with the bag making machine, a second bag from the stock packaging material having approximately the second length. The method may end by substantially enclosing the second object in the second bag.

Embodiments of the present disclosure also include a bag making machine configured to receive a flattened tubular stock material, a longitudinal axis of the tubular stock material corresponding with a direction of travel of the stock material through the bag making machine. The machine comprises a feeder configured to draw a desired length of the stock material from a roll. The machine also includes a cutter, which when activated, is configured to separate an upstream portion of the stock material from a downstream portion of the stock material. The machine includes a sealer, which when activated, is configured to form a seal within the stock material traverse to the direction of travel while substantially simultaneously separating an upstream portion of the stock material from a downstream portion of the stock material. A controller of the machine is programmed to alternate use of the cutter and the sealer such that the feeder operates to draw the stock material between each use of the cutter and the sealer.

Other embodiments of the present disclosure include methods of making a series of bags from a roll of a flattened continuous tube of stock material. An exemplary method comprises drawing a first length of the stock material from the roll and feeding the first length of the stock material past a sealer. The method then includes dispensing a first bag, the first bag having an open leading edge and a sealed trailing edge, by operating the sealer to form a seal within the stock material while also substantially simultaneously separating the first length of stock material from the roll with the sealer. The method further comprises drawing a second length of stock material from the roll and feeding the second length of stock material past a cutter. The method continues by dispensing a second bag, the second bag having a sealed leading edge and an open trailing edge, by operating the cutter to separate the second length of stock material from the roll, the sealed leading edge of the second bag having been created by the sealer during dispensing of the first bag.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Significant improvements can be made to the process of packaging furniture discussed above. As presently configured, the steps of selecting and applying the shrink bag 22 to the furniture piece 14-18 can create several problems. First, significant amounts of excess packaging material is being used because the packer 28 often is forced to select an overly large shrink bag 22 to avoid the mistake of selecting a shrink bag that is too small to enclose the desired furniture piece 14-18. When the selected shrink bag 22 is too large, the material costs are higher than necessary. Shrink bags 22 are typically sold by weight of material. Therefore, a shrink bag 22 that is too big has a higher cost than one that is a more correct size. Additionally, the excess material from an oversize shrink bag 22 can cause other problems. An abundance of extra material may interact with the tape applied prior to the shrink tunnel 30 in a negative way, resulting in the shrink bag 22 opening prematurely. An abundance of extra material can also droop if not properly taped, causing the shrink material to snag or otherwise get caught up in the shrink tunnel 30. Therefore, there is a need for shrink bags 22 that more consistently fit the furniture pieces 14-18, or other large relatively uniquely shaped products, being packaged for shipment.

One solution to the problem of oversized shrink bags 22 would be to increase the number of distinct rolls 24 available to the packer 28. By reducing the incremental size difference between each bag size, the packer 28 would be able to select a shrink bag 22 that more closely fits the next product along the packaging line 10. Increasing the number of unique bag configurations, however, would be expected to slow the packaging process by increasing the available choices to the packer 28. Larger racks 26 would be required, increasing the complexity of inventory control, requiring additional floor space, and requiring additional time for the packer 28 to travel between the appropriate rack and the conveyor 12.

Figure 3:
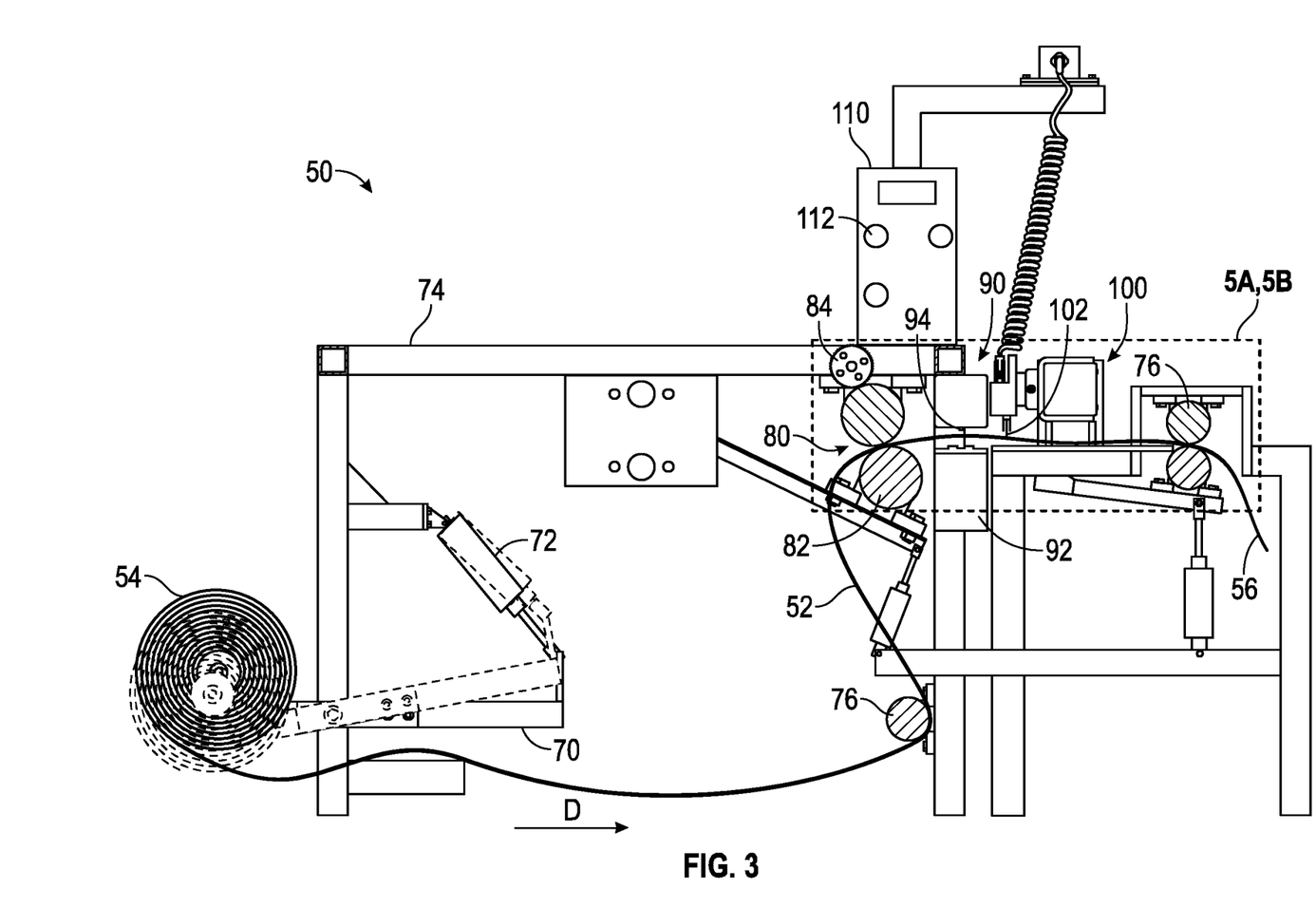
FIG. 3 shows a bag making machine according to an embodiment of the present disclosure.

Instead, as shown in FIG. 3, a bag making machine 50 is configured to create a custom-length shrink bag on-demand during the process of packaging uniquely shaped products. The bag making machine 50 receives stock packaging material 52 provided on a roll 54. The stock packaging material 52 is preferably provided in the form of a gusseted continuous tube of material. The gussets allow for the diameter circumference of the resulting bag to be wider than the width of the roll 54. A flat tube of material, i.e. without gussets, is also contemplated. The longitudinal axis A (see FIG. 4) through the tube of material is understood as wrapped around the central axis of the roll 54. The longitudinal axis A through the tube of material follows a path parallel with the direction of travel D as the material 52 is unrolled and passed through the bag making machine 50.

The stock packaging material 52 is preferably a shrink film made from linear low-density polyethylene (LLDPE), which has a melting temperature of approximately 220 degrees F., and which is configured to shrink when heated, as is known in the art. The material 52 has a thickness in the range of about 3.7 Mil to about 4 Mil. Suitable rolls for use in the furniture industry may be 60" wide and sold by weight. While shrinkable polymers are preferred, the bag making machine 50 may be suitable for use with non-shrinking stock packaging material in some embodiments.

Figure 4:
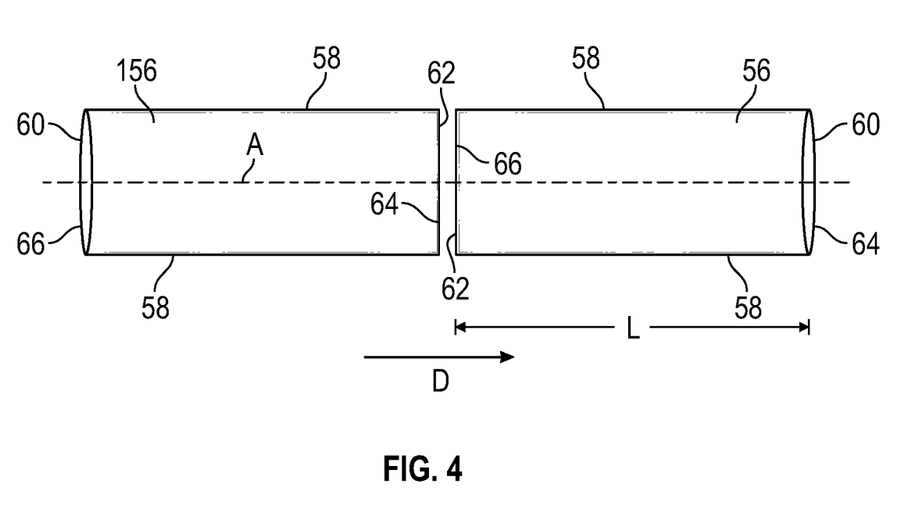
FIG. 4 is a top view of the packaging bags created by the bag making machine according to embodiments of the present disclosure.

The stock packaging material 52 moves through the bag making machine 50 along the direction of travel D in FIG. 3. The stock packaging material 52 is transformed into a packaging bag 56 by the bag making machine 50. The packaging bag 56, immediately upon being created, i.e. becoming separate from the remainder of the stock packaging material 52, may be substantially flat. When considered in two-dimensions, as seen in FIG. 4, the packaging bags 56, 156 created by the bag making machine 50 may each include a pair of pre-closed edges 58 generally parallel with the direction of travel D. An open edge 60 occurs traverse to the direction of travel D. A sealed edge 62 occurs traverse to the direction of travel and opposite the open edge 60. As described further below, the bag making machine 50 generates first packaging bags 56 where the open edge 60 is a leading edge 64 of the first packaging bag as it leaves the machine. The bag making machine 50 also generates second packaging bags 156 where the sealed edge 62 is the leading edge 64 of the second packaging bag as it leaves the machine. The leading edge 64 is understand as the portion furthest along, i.e. downstream, relative to the direction of travel D. By contrast, a trailing edge 66 is opposite the leading edge 64 and is further upstream relative to the direction of travel D.

Returning to FIG. 3, a bag making machine 50 may include a pair of receiver arms 70 configured to hold and position the roll 54 of stock packaging material 52 and allow the roll to rotate relative to the receiver arms 70 so that the stock packaging material can unroll. The pair of receiver arms 70 may be provided with a lift function to assist with receiving the roll 54. For example, actuators 72, for example pneumatic actuators may pivot the receiver arms 70 relative to a frame 74 of the bag making machine 50. Pivoting the receiver arms 70, as shown in phantom lines, can allow the roll 54 to be more easily placed onto the bag making machine 50 without lifting the roll to a significant height above the floor.

Once the roll 54 of stock packaging material 52 is properly positioned on the receiver arms 70, the leading edge 64 of the material may be initially lead past one or more optional guide rollers 76.

Downstream from the receiver arms 70 and the guide roller 76, the bag making machine 50 includes a feeder 80, which may comprise a pair of nip rollers 82. The stock packaging material 52 is initially led between the nip rollers 82. During operation, one or both of the pair of nip rollers 82 is driven to pull a desired amount of stock packaging material 52 from the roll 54. As known the art, the pair of nip rollers 82 are configured to press against one another with the stock packaging material 52 tightly sandwiched therebetween. This pressing force between the nip rollers 82 provides the friction to draw the stock packaging material 52 from the roll 54 as the nip rollers 82 turn. A counter 84, such as an encoder/counter available from Red Lion Controls, is preferably linked to one of the nip rollers 82 to sense, measure or otherwise determine the amount of stock packaging material 52 that has been pulled from the roll 54. The amount of stock packaging material 52 corresponds with the approximate bag length L of the packaging bags 56, 156.

Figure 5A:
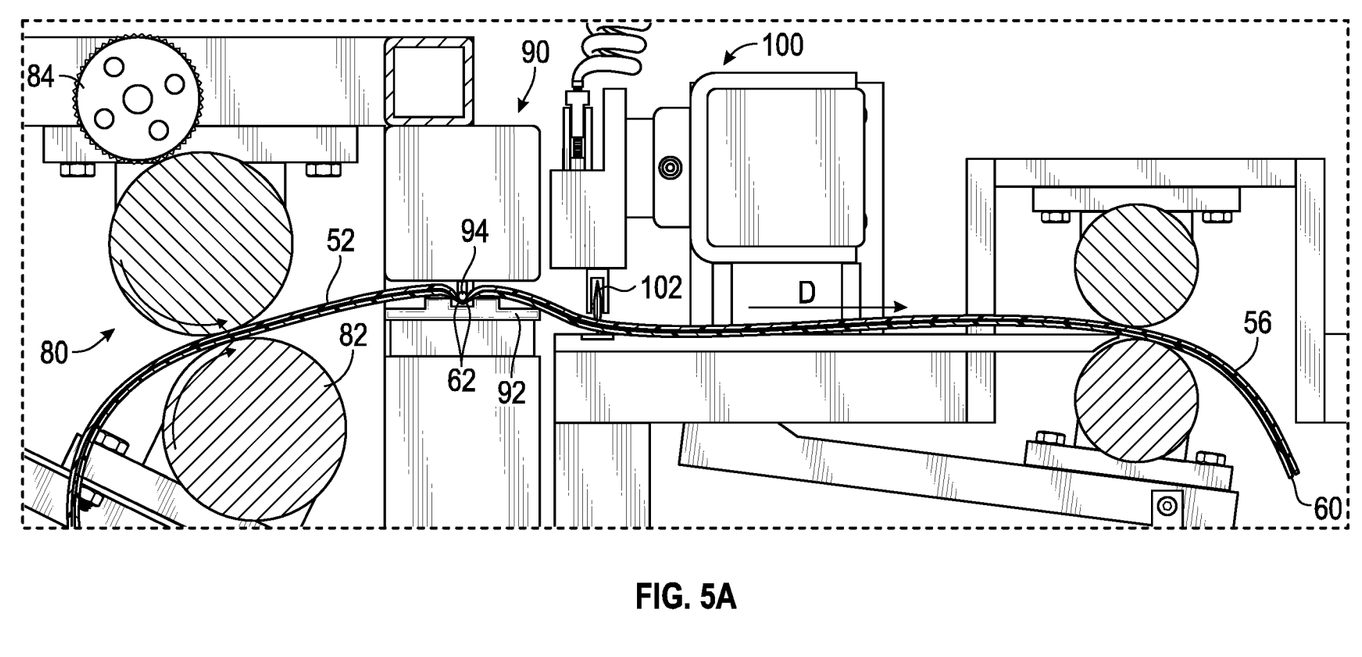
FIG. 5A is a detailed view of the bag making machine with a sealer in use.

Arranged beyond the feeder 80 is a sealer 90. The sealer 90 is shown in more detail in FIGS. 5A and 5B. The sealer 90 may comprise a press 92 and a heating element 94. An example heating element is a bare metal wire, whose resistance generates heat. As is known in the art, the wire may be mounted to the frame 74 by a spring or other tensioning mechanism to hold the wire taut as the wire expands with increasing temperature. According to one embodiment, the sealer 90 functions by closing the press 92 to clamp the stock packaging material 52 into contact with the heating element 94 as seen in FIG. 5A. In one embodiment, direct contact between the heating element 94 and the stock packaging material 52 results in melting the stock packaging material and fusing together adjacent layers of the material along the length of the heating element to simultaneously form a seal traverse to the longitudinal axis A of the flatten tubular stock packaging material. At the same time, the heating element 94 sufficiently melts, and in some cases burns, the stock packaging material 52 to cause separation between a first portion of the stock packaging material downstream past the sealer 90 and a second portion of the stock packaging material located upstream of the sealer 90 and still attached to the roll 54. When the first portion of the stock packaging material has separated from the second portion of the stock packaging material, a seal has been formed by the melting, bonding, and cooling of the stock packaging material adjacent to the heating element 94 on both the first portion and the second portion. In other words, the sealer 90 effectively forms a seal and splits the seal in two, to form a seal for the first portion and a seal for the second portion. Therefore the sealer 90 may be referred to as forming two seals at once. FIG. 5A identifies the resulting pair of sealed edges 62. Other sealers 90 may be used that simultaneously separate the stock material and form a seal near the edge of each of the separated portions. For example the press 92 may include a blade centered between a pair of flat sealing heating elements, where the flat sealing heating elements do not cause separation of the stock material.

For use with shrink polymer as the stock packaging material 52, the heating element 94 can operate with a wire temperature of between about 240 degrees F. and about 300 degrees F. The press 92 can be closed, clamping the stock packaging material 52 between a pair of contact surfaces, for between about 4 seconds and about 8 seconds.

Returning to FIG. 3, further downstream along the direction of travel D, beyond the sealer 90, the bag making machine 50 includes a cutter 100. In one embodiment, the cutter 100 comprises a blade 102. Use of the cutter 100 is also shown in detail in FIG. 5B. When activated, the blade 102 traverses the stock packaging material 52 substantially perpendicular to the direction of travel D. The blade 102 separates a first portion of the stock packaging material 52 located downstream along the direction of travel D beyond the cutter 100 from a second portion of the stock packaging material that is located upstream of the cutter. The cutter 100 may be activated to move across the direction of travel D by a pneumatic actuator. Alternatively, the cutter 100 may separate the first portion of stock packaging material from the second portion by slicing in a direction normal to the flattened plane of the stock packaging material 52. Additional cutter types may be employed that create bag separation without causing sealing of downstream or upstream portions of the stock material. Examples include punch presses, perforation wheels or low temperature lasers.

In the illustrated embodiment of FIG. 3, the cutter 100 is located downstream of the sealer 90. In other embodiments, however, the sealer 90 may be positioned downstream of the cutter 100, but the first attempt to create a packaging bag from each fresh roll 54 may create a small initial segment of waste material.

As seen in FIG. 3, prior to exiting the bag making machine 50, one or more additional guide rollers 76 may be provided to maintain the stock packaging material 52 as flat as possible as it travels through the machine.

The operation of the bag making machine 50 is preferably controlled by a controller 110. The controller 110 includes at least a user interface 112 and a processor. The controller 110 operates the feeder 80, the sealer 90, the cutter 100 and the receiver arms 70, if applicable. The controller 110 may be programmed such that for each packaging bag 56, 156 created by the bag making machine 50, the sealer 90 and the cutter 100 are actuated in an alternating pattern. For each packaging bag 56, 156 generated, only one of the sealer 90 and the cutter 100 is used.

The user interface 112 may be provided as a display and a panel of manually operated buttons and switches. In a preferred embodiment, the user interface 112 may be provided in the form of a touch screen based human machine interface (HMI). A touch screen HMI can provide for adaptability such that the nature of the input can change if the programming of the processor is changed. For example, the processor may be able to present a one or more "buttons" upon the touch screen to correspond with one or more preset bag lengths. A suitable HMI may include the Graphite® series of hardware available from Red Lion of York, Pa.

A single controller 110 may be operably linked to two or more bag making machines 50. In other embodiments, a single controller 110 may operate a bag making machine 50 with more than one feeder 80. The plurality of feeders 80 may feed into the same or separate sealers 90 and cutters 100. Separate feeders 80, whether in the same or different bag making machines 50, allows for feeding from separate rolls 54 of stock packaging material 52, such as rolls with different bag circumferences. Use of a single controller 110 would avoid having the operator walk between separate machines to create packaging bags 56, 156 with different circumferences.

Figure 6:
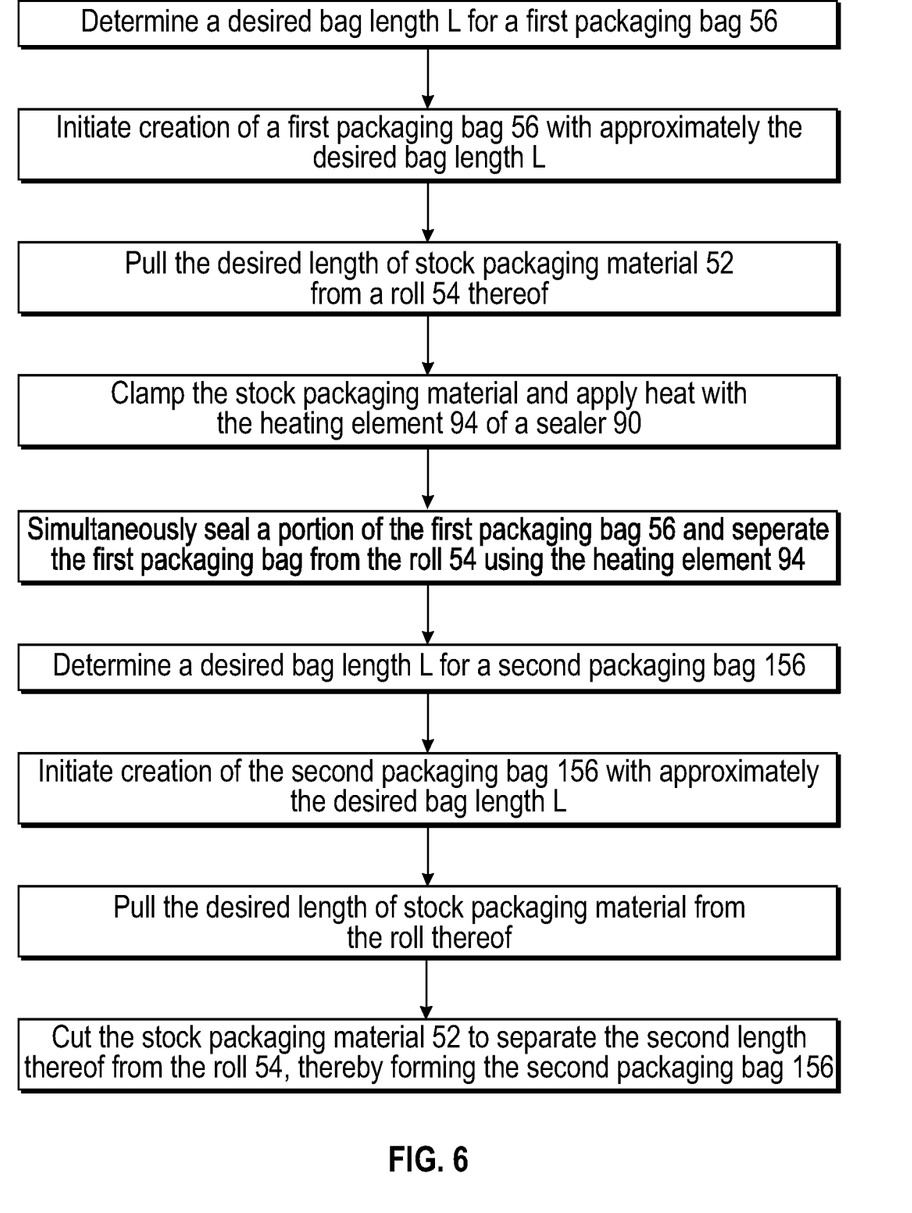
FIG. 6 is a flow chart for a process of operating the bag making machine according to an embodiment.

Operation of the bag making machine 50 may progress according to the following process as also shown in the flow chart of FIG. 6. An operator, such as the packer 28, uses the user interface 112 to input into the controller 110 a desired bag length L of a first packaging bag 56. The operator then initiates creation of the first packaging bag 56 via the user interface 112.

In other embodiments, the desired bag length L is calculated by the controller 110 upon an alternative input into the user interface 112 from the operator. An example of an alternative input would be a product identifier. In other embodiments, the desired bag length L is input electronically for use by the controller 110 without the operator using the user interface 112. Electronic input may include a scanner or sensor. In some embodiments, creation of the first packaging bag 56 may be automatically initiated without direct operator intervention. For example, the upstream scanner or sensor may provide both a signal that provides both a bag length related input as well as a command to begin creating the associated bag.

In one embodiment, the input into the controller 110 comprises bag length L (see FIG. 4), which corresponds to the distance between the open edge 60 and the sealed edge 62 of the first packaging bag 56 in the flattened, i.e. two-dimensional state, as the first packaging bag leaves the bag making machine 50. As will be appreciated by one of ordinary skill in the art, the bag length L is usually greater than the furniture length X (see FIG. 1) of the furniture piece 14-18 to be enclosed. This ensures the first packaging bag 56 is a sufficient size to cover each end of the furniture piece 14-18. The operator may determine bag length L as a function of furniture length X, where X can be determined by a scale provided along the conveyor 12. For example, L may equal 1.25*X. In other embodiments, the operator may input the furniture length X of the desired furniture piece 14-18 at the user interface 112, and the controller 110 may convert to the required bag length L.

In another embodiment, determining the appropriate bag length L may be even more closely determined by not only considering the furniture length X, but also the furniture height Z as shown in FIG. 1. The furniture height Z may be the height of the furniture piece 14-18 relative to the top of the conveyor 12, or may include the thickness of the conveyor. Adding the thickness of the conveyor 12 may take into account the method of bagging the furniture piece 14-18 by initially wrapping the packaging bag 56 under the end of the conveyor, sometime known as the diving board. A taller furniture piece 14-18 in the height dimension Z will require a longer packaging bag 56 to cover the ends of the furniture piece. For example, the bag length L may equal $(X+H)*(1+N)$, where N is a tolerance factor to avoid generating a packaging bag 56 that is too small. N is less than 0.25 and preferably less than 0.1. Determination of the bag length L in terms of both the furniture length X and the furniture height Z is most preferable when the dimensions of the furniture piece 14-18 are determined by a sensor/scanner, or when the dimensions are pre-loaded into memory of the controller 110.

In some embodiments, the furniture width Y (see FIG. 1) of the furniture piece 14-18 may also factor into determining the desired bag length L. According to the conventional method of placing the packaging bag 56 over the furniture piece 14-18, the width of the conveyor 12 would be a limiting factor, and therefore the furniture width Y may be estimated as a constant value equal to the width of the conveyor. Again, where the furniture width Y is factored into determination of the bag length L, the controller 110 is preferably used to determine L.

In yet other embodiments, the circumference of the stock packaging material 52 is also a factor in determining the desired bag length L based on at least one of the furniture length X, the furniture height Z and the furniture width Y of a respective furniture piece 14-18.

Once the bag length L is determined, creation of the first packaging bag 56 begins as the feeder 80 pulls the desired length of stock packaging material 52 from the roll 54. Again, the roll 54 provides a flattened continuous tube of stock packaging material 52 with an open initial leading edge and pre-closed edges 58 along the sides. As the stock packaging material 52 is pulled from the roll 54, the stock packaging material is led past the sealer 90 and the cutter 100 with the initial leading edge first. After the desired length of stock packaging material 52 has been pulled from the roll 54 by the feeder 80, as determined by the controller 110 in connection with the counter 84, the controller may activate the sealer 90. As seen in FIG. 5A, the stock packaging material 52 positioned at the sealer 90 is clamped by the press 92 into contact with the heating element 94. The stock packaging material 52 is subsequently separated in two by the contact between the heating element 94 and the material, while a sealed edge 62 is formed adjacent to the heating element 94 on each portion of the separated material. Upon release of the press 92, the first packaging bag 56 has been created, which has an open edge 60 corresponding with the leading edge thereof as the first packaging bag is removed from the bag making machine 50. The trailing edge of the first packaging bag 56 was sealed and separated from the roll 54 by the use of the sealer 90. The first packaging bag 56 was therefore dispensed without operation of the cutter 100.

Figure 5B:
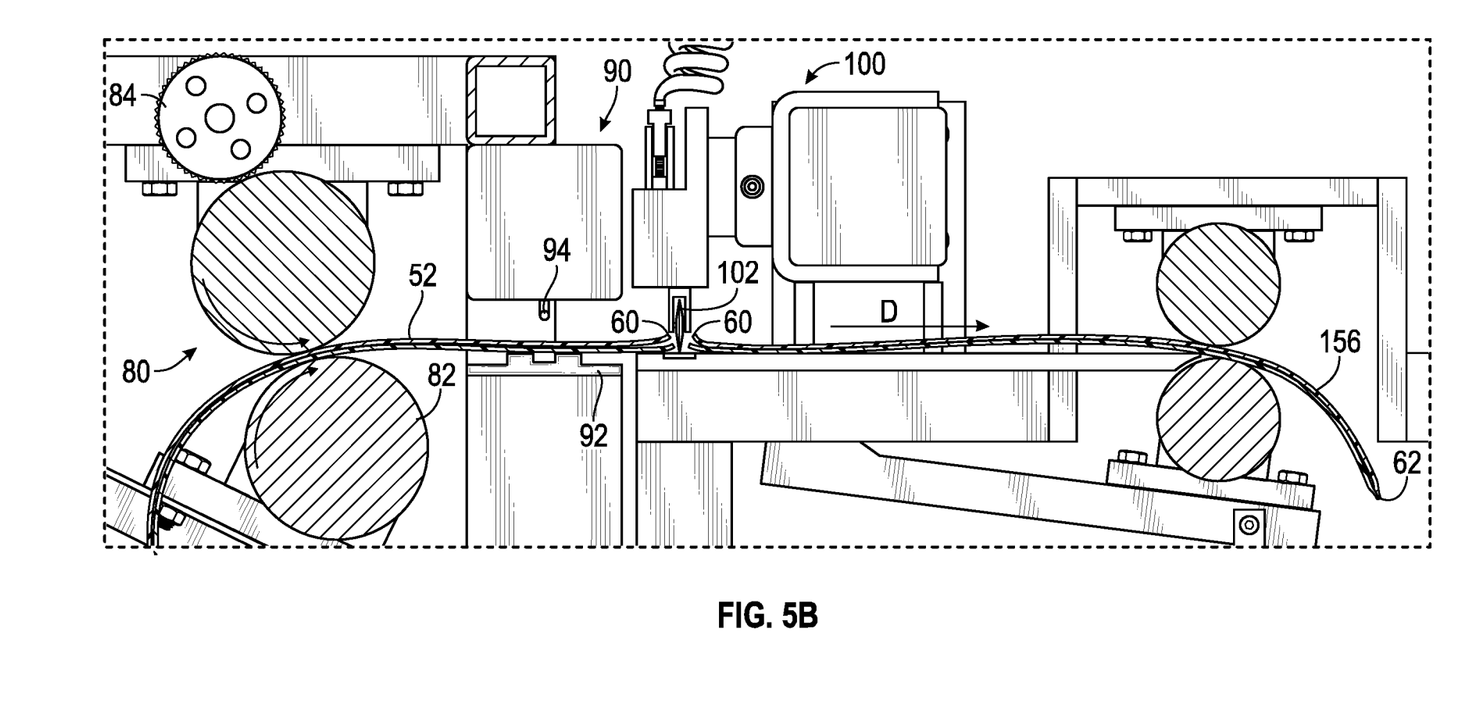
FIG. 5B is a detailed view of the bag making machine with a cutter in use.

The operator may then proceed to generate a second packaging bag 156. To create the second packaging bag 156, the operator may input a new desired bag length L, or information sufficient for the controller to determine L. If the operator desires for the second packaging bag 156 to have the same length as the immediate previous packaging bag, the operator may actuate the bag making machine 50 without an additional length related input. Again, the stock packaging material 52 will pass the sealer 90 and then pass the cutter 100 as the material is pulled from the roll 54 by the feeder 80. When a length of stock packaging material 52 has passed the feeder 80 sufficient to correspond with the desired bag length L of the second packaging bag 156, the controller 110 will signal the cutter 100 to separate the stock packaging material into the second packaging bag 156 downstream of the cutter 100 and a remaining portion of the stock packaging material that remains attached to the roll 54. This separation by the cutter 100, specifically the blade 102, is shown in FIG. 5B. Based on the steps described, the second packaging bag 156 will be dispensed from the bag making machine 50 bottom first (e.g. having a sealed edge 62 as the leading edge). The leading edge of the second packaging bag 156 was sealed during creation of the first packaging bag 56, and the open edge 60 of the second packaging bag was created by use of the cutter 100. While the sealer 90 had a role in creating the second packaging bag 156, the sealer was not necessary for creating the second packaging bag at a time after the first packaging bag 56 was made. As such, the second packaging bag 156 may be referred to as having been dispensed without separate operation of the sealer 90.

As used herein, the term "approximately" may be used to describe the length of a packaging bag 56, 156 relative to a desired bag length. The length of the packaging bag is "approximately" the desired bag length if the actual length of the flattened bag is between the desired bag length L as a minimum and the desired bag length L plus the distance between the sealer 90 and the cutter 100 as a maximum. An acceptable bag may have an actual length (when initially flat) below the desired bag length L or above the maximum length due to de minimus length variation caused by counter calibration, reduction of material during sealing, etc.

Having described the bag making machine 50 and the operation of the machine for creating a first packaging bag 56 and a second packaging bag 156, further embodiments of the present disclosure use a bag making machine within a process of packaging a series of differently shaped objects. This process is summarized in FIG. 7. The differently shaped objects may be a series of furniture pieces 14-18. Other processes faced with the need to package a series of relatively large, different sized or shaped products could be similarly improved using the bag making machine 50.

Figure 7:
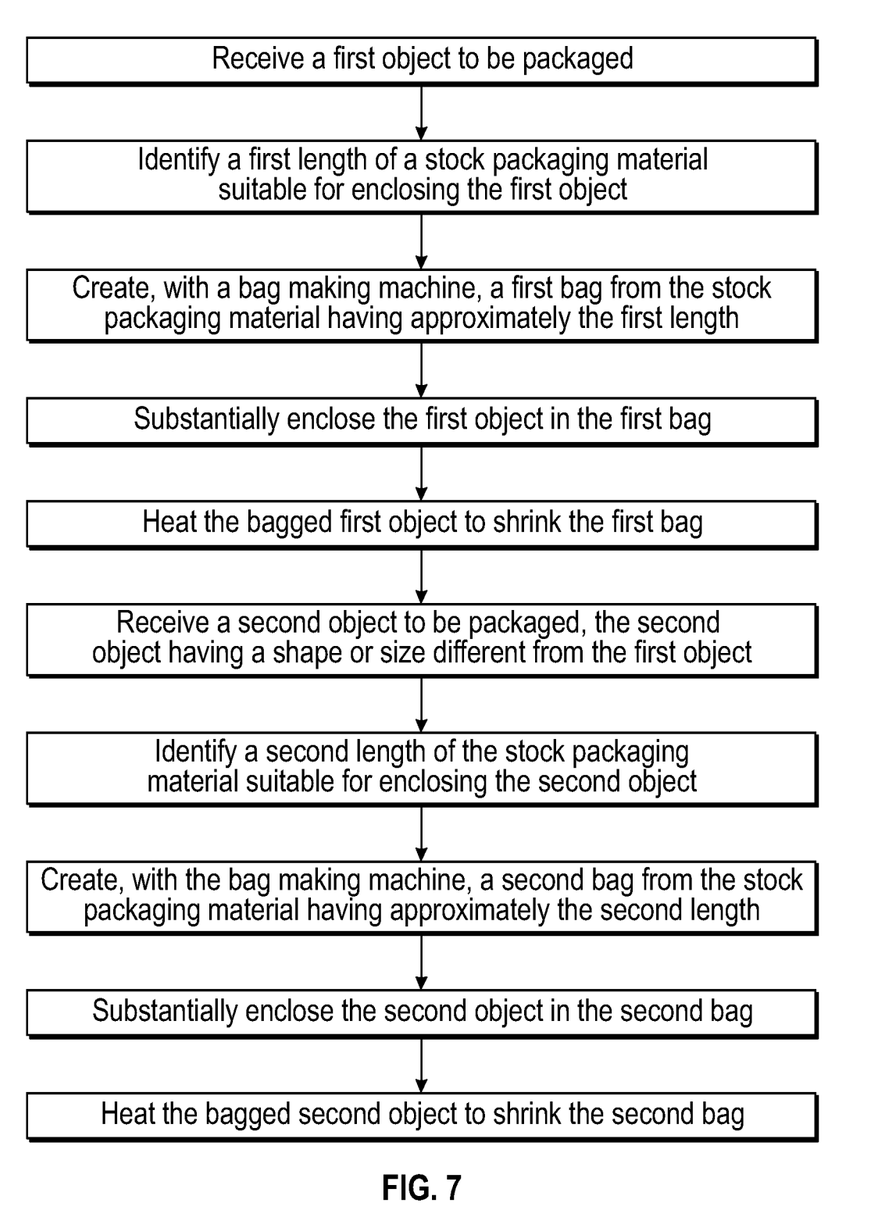
FIG. 7 is a flow chart for a packaging process according to an embodiment of the present disclosure.

FIG. 7 is a flow chart of a packaging process according to an embodiment of the present disclosure. The process may include receiving a first object to be packaged. In one example, receipt of an object is the result of the object arriving on a conveyor 12 from an upstream work station. When the first object is received, a task is to identify the length and/or circumference of a packaging bag 56 suitable for enclosing the first object. As discussed above, the bag length L should provide a bag that will enclose the object without using a bag whose length is excessive, thereby minimizing waste in material usage and cost. The task of identifying the bag length L may be performed by a human operator. The task of determining bag length may be supplemented by a measuring device (e.g. a ruler) mounted along a conveyor 12. The operator may then visually take a measurement, for example the furniture length X, as the object passes the ruler. In another embodiment, the furniture length X or the bag length L could be printed on the optional tray 20 and read by the operator. A correlation table may be provided with a list of regularly packaged objects correlated with a predetermined bag length for each object. Such a table may be read or memorized by the operator. Alternatively, such a table may be programmed into memory within the controller 110. The operator would then input a product identifier for the first object into the user interface 112, and the processor would then identify the desired bag length based upon pre-loaded shape characteristics of the identified product. The product identifier could be one or more of the furniture length X, furniture width Y, furniture height Z, an SKU, a product type, etc.

In some embodiments, the step of identifying a desired bag length L may bypass the operator altogether. For example, a sensor or scanner may be provided to measure one or more dimensions of the object to be packaged. The scanner could read a label on the product that provides the SKU. The sensor or scanner could be in operable communication with the controller 110 to determine the desired bag length, and even commence the bag making process without input from the operator.

After determining the desired bag length, the packaging process includes creating, with a bag making machine, a first packaging bag 56 from the stock packaging material 52 having approximately the first bag length. The step of creating the first packaging bag 56 may progress as described above. The bag making machine 50 may create the first packaging bag 56 with an open leading edge 64 and a sealed trailing edge 66 as a result of operating the sealer 90 as described above. Use of the bag making machine 50 as discussed above is one embodiment of the present packaging method. In other embodiments, however, the present packaging method does not require specific use of the bag making machine described herein. In those embodiments without the specific machine described herein, the present process is an improvement over the process shown and described in FIGS. 1 and 2 due to creating packaging bags on-demand instead of selecting pre-formed shrink bags 22 from the rolls 24.

Once a machine has custom made the first packaging bag 56 for the first object, the operator packages the first object by substantially enclosing the first object in the first packaging bag 56. The step of enclosing the first object within the first packaging bag 56 may be conducted at least in part by a human operator. In other embodiments, however, robotics or other automation could be used to take the first packaging bag 56 from the bag making machine and applying it to the first object.

The packaging method continues by receiving a second object to be packaged, the second object having a shape or size different from the first object. Receiving the second object is likely to occur in much the same way as the first object was received. The step of receiving the second object is, however, not limited to the same steps or processes that resulted in receiving the first object.

During, or subsequent to, receipt of the second object, a second length of the stock packaging material suitable for enclosing the second object is identified. The identification of the second length may include the same or different steps compared to the process of identifying the first length for the first object.

A machine is then operated to create a second packaging bag 156 on demand as shown in FIG. 5B, the second packaging bag having approximately the second length. Again, in one embodiment, any known machine configured to make a bag of a given length on-demand would be suitable for this step. In other embodiments, however, the second packaging bag 156 may be created from the bag making machine 50 as specifically discussed above. In that case, creating the second packaging bag 156 may include dispensing the second packaging bag from the bag making machine 50 with a sealed leading edge 64 and an open trailing edge 66. This results from operating the cutter 100 to separate the second length of stock packaging material 52 from the roll 54, the sealed leading edge 64 of the second packaging bag 156 having been created by the sealer 90 during creation of the first packaging bag 56.

Once the machine has custom made the second packaging bag 156 for the second object, the operator packages the second object by substantially enclosing the second object in the second packaging bag 156. The step of enclosing the second object within the second packaging bag 156 may be conducted, at least in part, by a human operator. In other embodiments, however, robotics or other automation could be used to take the second packaging bag 156 from a bag making machine and applying it to the second object.

In one embodiment of the packaging method, the method uses a shrinkable polymer as the stock packaging material 52. After each object is enclosed in a respective packaging bag 56, 156, heat is applied to shrink each packaging bag around its respective object. The packaged items may then be loaded for shipment.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A bag making machine configured to receive a flattened tubular stock material, a longitudinal axis of the tubular stock material corresponding with a direction of travel of the stock material through the bag making machine, the machine comprising:
   a feeder configured to draw the stock material from a roll;
   a sealer is configured to form a seal within the stock material traverse to the direction of travel;
   a cutter independent of the sealer configured to separate an upstream portion of the stock material from a downstream portion of the stock material; and
   a controller programmed to:
      operate the feeder to draw a first length of the stock material from the roll and feeding the first length of the stock material past the sealer;
      dispensing a first bag having an open leading edge and a sealed trailing edge, by operating the sealer to separate the first length of the stock material from the roll with the sealer simultaneously forming a pair seals within the stock material;
      drawing a second length of the stock material from the roll and feeding the second length of stock material past the cutter; and
      dispensing a second bag having a sealed leading edge and an open trailing edge, by operating the cutter to separate the second length of stock material from the roll, the sealed leading edge of the second bag having been created by the sealer during dispensing of the first bag.

2. The bag making machine of claim 1, wherein the first length of the stock material is different from the second length of the stock material.

* * * * *